March 16, 1971     D. W. BIRNSTINGL     3,570,309

ELECTROMAGNETIC FLOWMETERS

Filed Oct. 1, 1968

INVENTOR
DAVID WILDON BIRNSTINGL
BY Young + Thompson
ATTORNEYS

United States Patent Office 3,570,309
Patented Mar. 16, 1971

3,570,309
ELECTROMAGNETIC FLOWMETERS
David Wildon Birnstingl, Stroud, England, assignor to Mawdsley's Limited, Dursley, Gloucestershire, England
Filed Oct. 1, 1968, Ser. No. 764,156
Claims priority, application Great Britain, Oct. 3, 1967, 44,868/67
Int. Cl. G01p *5/08*
U.S. Cl. 73—194
11 Claims

ABSTRACT OF THE DISCLOSURE

A method and an electrical circuit to compensate for variations in the energizing current in the field coils of an electromagnetic flowmeter. The circuit comprises a compensating feedback loop with an error device and a pulse generator which acts to supply a repetitive output signal with the ratio of the pulse duration to the total periodic time proportional to the ratio of two signals which are injected into the feedback loop and which are respectively proportional to a stabilized reference signal and the energizing current in the field coils. The circuit includes a measuring circuit with a modulator which acts to modulate a signal proportional to the signal detected by the electrodes in accordance with the ratio of the pulse duration to the total periodic time to provide a final output signal which is proportional to the ratio of the electrode signal to the energizing current and hence proportional to the true flow rate.

---

This invention relates to electromagnetic flowmeters having a tube to contain a fluid flow and magnetic field coils energized by an A.C. supply to provide an alternating magnetic field across the tube. Two opposed electrodes are mounted in the wall of the tube and, in accordance with the laws of electromagnetic induction, a voltage is generated between the electrodes when the fluid flows through the magnetic field between the electrodes. The generated voltage is detected by a measuring circuit and is proportional to the product of the flow rate and the energizing current in the field coils.

In particular, the invention is concerned with a method and apparatus for compensating for variations in the magnitude of the energizing current in the field coils, this compensation being necessary because the A.C. supply is normally unstabilized and the voltage detected by the electrodes and supplied to the measuring circuit is only proportional to the flaw rate if the energizing current, and hence the magnetic field, is of constant amplitude.

A previous attempt at solving this problem utilizes a pulse frequency modulation technique in which the frequency of a pulse repetition (P.R.F.) signal produced by a pulse generator is proportional to the ratio of the voltage detected by the electrodes to the voltage applied to the field coils. The P.R.F. signal modulates a D.C. reference voltage to produce a D.C. output voltage proportional to the flow rate but insensitive to variations in the energizing current in the field coils.

Such an arrangement suffers from the disadvantage that the pulse generator must have a large operative frequency range to accommodate the variation in frequency of the P.R.F. signal which occurs as a result of the large variation in the amplitude of the signal detected by the electrodes. It has also been found that this arrangement cannot be used when the flow rate falls to a value corresponding to that at which the frequency of the P.R.F. signal approaches the frequency of the A.C. supply for the field coils. The present invention also uses pulse modulation, but in a manner which overcomes these disadvantages.

According to one aspect of the invention a method of compensating for variations in the energizing current supplied to the field coils of an electromagnetic flowmeter, comprises utilizing a stabilized reference signal and a signal proportional to the energizing current to produce a repetitive output signal from a pulse generator which is modulated in such manner that the ratio of the pulse duration to the total periodic time is proportional to the ratio of the first two signals, and utilizing that output signal to modulate the electrode signal, either before or after amplification of the latter, to provide a final output signal which is proportional to the ratio of the electrode signal to the energizing current and hence proportional to the true flow rate.

The output signal from the pulse generator may be modulated in any one of three alternative ways: the repetition rate (and, therefore, the periodic time) may be variable with each pulse of constant time duration, the time duration of the pulses may be variable and the repetition rate constant or both the repetition rate and the time duration of the pulses may vary. It will be appreciated that the second of these alternatives is equivalent to pulse width modulation. It is preferred that all said signals should be in the form of voltages, with the reference signal and the signal proportional to the energizing current desirably D.C. voltages.

The invention also includes within its scope an electrical circuit to enable the method in accordance with said one aspect of the invention to be carried out. Hence, according to another aspect of the invention an electrical circuit to compensate for variations in the energizing current in the field coils of an electromagnetic flowmeter, comprises a compensating feedback loop with an error device and a pulse generator which acts to supply a repetitive output signal with the ratio of the pulse duration to the total periodic time proportional to the ratio of two signals which are injected into the feedback loop and which are respectively proportional to a stabilized reference signal and the energizing current in the field coils, and a measuring circuit including a modulator which acts to modulate a signal proportional to the signal detected by the electrodes in accordance with the ratio of the pulse duration to the total periodic time to provide a final output signal which is proportional to the ratio of the electrode signal to the energizing current and hence proportional to the true flow rate.

The pulse generator will normally be a mark/space generator and the latter is conveniently supplied directly by the error device which may be in the form of a differential amplifier. The feedback loop preferably comprises a further modulator, the differential amplifier and the mark/space generator connected in series, the pulse generator output signal also being fed to the further modulator in the feedback loop to modulate one of the two input signals injected into the feedback loop, the other of which is fed to the other terminal of the differential amplifier. The mark/space ratio of the pulse generator output signal may be arranged to be directly proportional to the ratio of the reference signal to the signal proportional to the energizing current in which case the final output signal is derived from the output of the modulator in the measuring circuit. With this arrangement the pulse generator output signal conveniently modulates the signal proportional to the energizing current, this modulated signal being smoothed and fed to one terminal of the differential amplifier in the feedback loop with the reference signal being fed to the other terminal of this amplifier.

Alternatively, the mark/space ratio of the pulse generator output signal may be inversely proportional to the ratio of the reference signal to the signal proportional to the energizing current in which case the measuring circuit may include an operational amplifier the loop of which includes the modulator and a smoothing circuit, the input of the operational amplifier being constituted by the signal from the electrodes and the output being said final signal. With this arrangement the closed-loop gain of the operational amplifier is inversely proportional to the mark/space ratio of the generator signal so that the final signal is directly proportional to the quotient of the voltage from the electrodes and the voltage of the A.C. source supplying the field coils.

The invention will now be further described with reference to the accompanying drawings which show, by way of example, two measuring circuits embodying the invention and for use with an electromagnetic flowmeter.

Figure 1:
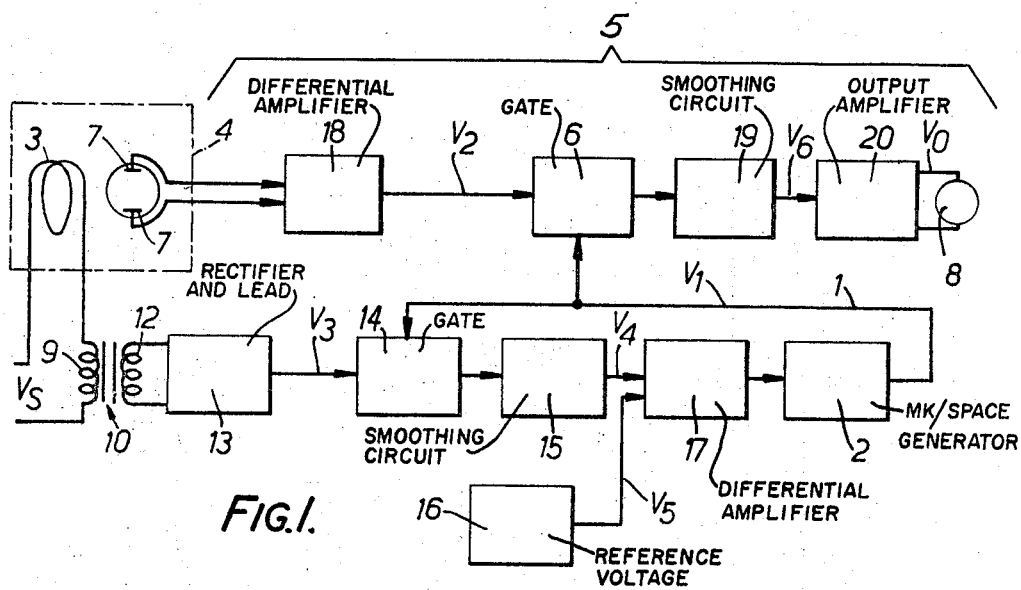
FIG. 1 is a block circuit diagram illustrating one of the circuits.

Referring to FIG. 1, pulse width modulation is employed and the circuit comprises a compensating feedback loop 1 including a mark/space generator 2 which produces an output voltage $V_1$ the mark/space ratio $k$ of which varies in dependence upon the amplitude of the A.C. supply $V_s$ connected to the field coils 3 of the electromagnetic flowmeter, generally indicated by the numeral 4. The mark/space generator output voltage $V_1$ is fed to a measuring circuit 5 comprising a modulator in the form of a gate 6 which modulates a voltage $V_2$ derived from the two electrodes 7 of the flowmeter 4 to provide a final output voltage $V_0$ which is detected by an indicator 8 and which is proportional to the quotient of the voltage detected by the electrodes and the voltage of the A.C. supply $V_s$ connected to the field coils 3 and supplying the energizing current.

In the circuit of FIG. 1, the primary winding 9 of a current transformer 10 is connected in series with the field coils 3 and the secondary winding 12 is connected to a rectifier 13 incorporating resistive loading to yield a D.C. output voltage $V_3$ which is fed to a further gate 14 in the feedback loop 1 and is proportional to the energizing current in the field coils 3. The voltage $V_1$ from the mark/space generator 2 is also fed to the gate 14 and modulates, by pulse width modulation, the voltage $V_3$ from the rectifier 13 so that the output of the gate 14 is in the form of a succession of pulses of constant frequency and of an amplitude corresponding to the amplitude of the voltage $V_3$. The output of the gate 14 is fed to a smoothing circuit 15 which produces a D.C. output voltage $V_4$ proportional to the product of the mark/space ratio $k$ and the voltage $V_3$.

A stabilized D.C. reference voltage $V_5$ from a source 16 and the voltage $V_4$ are respectively applied to two input terminals of a differential amplifier 17 the output of which feeds the mark/space generator 2, the differential amplifier 17 acting in the usual closed-loop manner to equalize the two signals (i.e. $V_4$ and $V_5$) fed to its inputs. By this means the mark/space ratio $k$ of the pulse generator output voltage $V_1$ is maintained directly proportional to the quotient of the D.C. reference voltage $V_5$ and the rectified voltage $V_3$ from the current transformer 10, this latter voltage being directly proportional to the energizing current in the coils 3.

The measuring circuit 5 includes a differential amplifier 18 to which the signal from the electrodes 7 is fed and which supplies the gate 6 in the measuring circuit 5; the output of the gate 6 is fed to a further smoothing circuit 19 and output amplifier 20. The voltage $V_6$ from the circuit 19 is fed to the amplifier 20 which provides said final output voltage $V_0$ which is directly proportional to the product of the mark/space ratio $k$ and the voltage $V_2$. As the voltage $V_2$ is proportional to the voltage detected by the electrodes, the output voltage $V_0$ is directly proportional to the flow rate and insensitive to variations in the A.C. supply voltage $V_s$.

Figure 2:
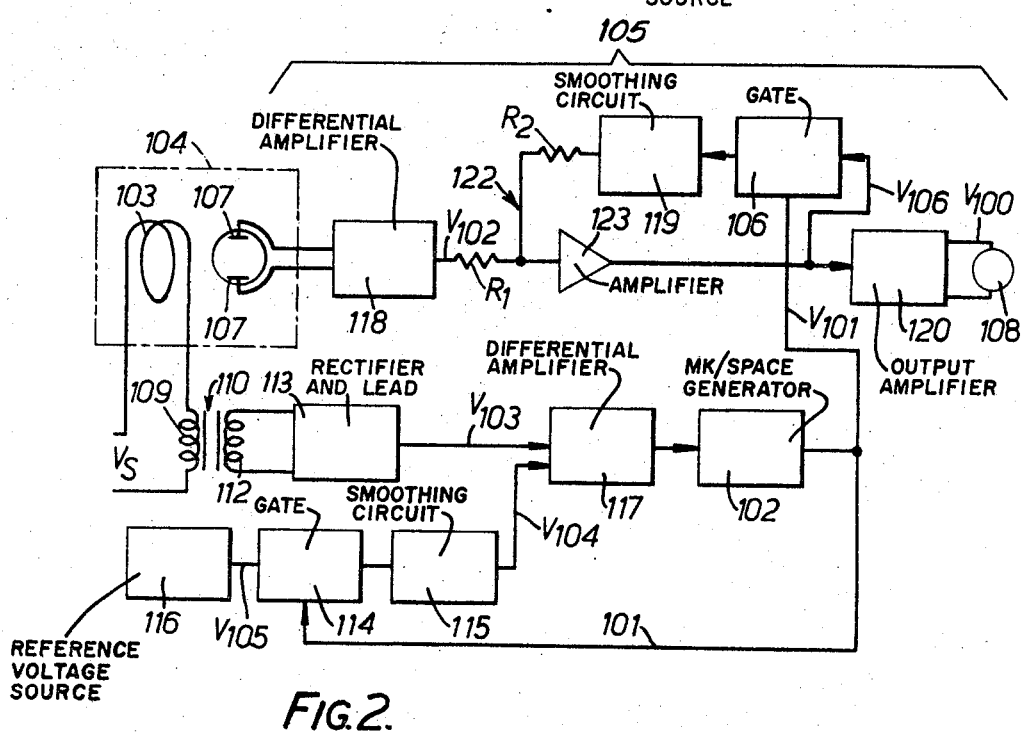
FIG. 2 is a circuit diagram similar to that of FIG. 1, but illustrating the other circuit.

In the measuring circuit of FIG. 2, pulse width modulation is again employed and similar parts to those of FIG. 1 have been given the same reference numerals increased by 100, i.e. the mark/space generator 2 of FIG. 1 corresponds to the mark/space generator 102 of FIG. 2. In addition, the voltage $V_2$ of FIG. 1 corresponds to the voltage $V_{102}$ of FIG. 2. The circuit of FIG. 2 is generally similar to that described except for the fact that the mark/space ratio $k$ is now arranged to be inversely proportional to the quotient of the D.C. reference voltage $V_{105}$ and the rectified voltage $V_{103}$ from the current transformer 110 and that the measuring circuit 105 has an operational amplifier 122 the loop of which includes the gate 106.

The desired mark/space ratio $k$ is obtained by gating the D.C. reference voltage $V_{105}$ with the mark/space generator output voltage $V_{101}$ and smoothing the output signal from the gate 114 to provide a signal $V_{104}$ which is fed to one terminal of the differential amplifier 117 to the other terminal of which the rectified voltage $V_{103}$ from the current transformer 110 is fed. As before, the output of the differential amplifier 117 is fed to the mark/space generator 102 and it will be appreciated that the compensating feedback loop 101 of this circuit may be said to correspond to that described with reference to FIG. 1 except for the fact that the D.C. reference voltage and the rectified voltage from the current transformer are interchanged.

The voltage detected by the electrodes 107 is fed to the differential amplifier 118 of the measuring circuit 105 and the output of the amplifier 118 is fed, through a resistor $R_1$ to the operational amplifier 122. The operational amplifier has a high-gain amplifier 123 and a resistor $R_2$ in its loop. In effect, the mark/space generator output signal $V_{101}$ fed to the gate 106 in the loop of the operational amplifier 122 acts to vary the closed-loop gain of the latter with the result that the output voltage $V_{106}$ of the operational amplifier 122 is directly proportional to the quotient of the voltage detected by the electrodes (or the voltage $V_{102}$ from the amplifier 118) and the mark/space ratio $k$. Thus the output voltage $V_{106}$ from the operational amplifier 122 is insensitive to fluctuations or variations in the supply voltage $V_s$ powering the field coils 3 and this output voltage is amplified to form the final output voltage $V_0$ which is detected.

As the mark/space ratio $k$ is dependent solely on the magnitude of the energizing current, which does not vary widely, it will be appreciated that the invention may employ a pulse generator 2 or 102 with a restricted operative range.

It will be appreciated to those skilled in the art that any conventional circuitry may be employed for the individual components of the circuits, and it is for this reason that specific circuit details are not disclosed herein.

The term "operational amplifier" is used herein to refer to the combination of a component high-gain amplifier and an associated feedback loop. Thus, in the circuit of FIG. 2, the operational amplifier 122 comprises the component amplifier 123, the gate 106, the smoothing circuit 119 and the resistor $R_2$.

I claim:

1. A method of compensating for variations in the energizing current supplied to the field coils of an electromagnetic flowmeter, comprising utilizing a stabilized reference signal and a signal proportional to the energizing current to produce a repetitive output signal from a pulse generator which is modulated in such manner that the ratio of the pulse duration to the total periodic time is proportional to the ratio of the first two signals, and utilizing that output signal to modulate the electrode signal, either before or after amplification of the latter, to provide a final output signal which is proportional to the ratio of the electrode signal to the energizing current and hence proportional to the true flow rate.

2. A method according to claim 1, wherein said ratio is proportional to the ratio of the reference signal to the signal proportional to the energizing current, the pulse generator output signal modulating, by way of a feedback loop, the signal proportional to the energizing current.

3. A method according to claim 1, wherein said ratio is inversely proportional to the ratio of the reference signal to the signal proportional to the energizing current, the pulse generator output signal modulating, by way of a feedback loop, the stabilized reference signal.

4. A method according to claim 1 wherein all said signals are voltages with the reference signal and the signal proportional to the energizing current having D.C. voltages.

5. An electrical circuit to compensate for variations in the energizing current in the field coils of an electromagnetic flowmeter, the circuit comprising a compensating feedback loop with an error device and a pulse generator which acts to supply a repetitive output signal with the ratio of the pulse duration to the total periodic time proportional to the ratio of two signals which are injected into the feedback loop and which are respectively proportional to a stabilized reference signal and the energizing current in the field coils, and a measuring circuit including a modulator which acts to modulate a signal proportional to the signal detected by the electrodes in accordance with the ratio of the pulse duration to the total periodic time to provide a final output signal which is proportional to the ratio of the electrode signal to the energizing current and hence proportional to the true flow rate.

6. A circuit according to claim 5 wherein all said signals are voltages with the reference signal and the signal proportional to the energizing current having D.C. voltages.

7. A circuit according to claim 5, wherein the feedback loop comprises a further modulator, a differential amplifier constituting said error device and the pulse generator in series, the output of the latter also being connected to the further modulator to modulate one of the two input signals injected into the feedback loop, the other of which is fed to the differential amplifier.

8. A circuit according to claim 7, wherein said one of the two input signals injected into the loop is the signal proportional to the energizing current, the ratio of the pulse duration to the total periodic time being directly proportional to the ratio of the reference signal to the signal proportional to the energizing current.

9. A circuit according to claim 7, wherein said one of the two input signals injected into the loop is the stabilized reference signal, with the ratio of the pulse duration to the total periodic time being inversely proportional to the ratio of the reference signal to the signal proportional to the energizing current.

10. A circuit according to claim 9, wherein the measuring circuit includes an operational amplifier the loop of which includes the modulator of the measuring circuit, the closed-loop gain of the operational amplifier being inversely proportional to the ratio of the pulse duration to the total periodic time.

11. A method of compensation in an electromagnetic flowmeter having electrodes developing an output proportional to the product $(QI)$ of the flow rate $(Q)$ and the energizing current $(I)$ comprising comparing the energizing current $(I)$ with a reference $(k)$ to vary in a pulse train the pulse duration in relation to period in like ratio $(I/k)$ and intermodulating the electrode output $(\alpha QI)$ and said pulse train $(\alpha I/k)$ so that the modulation product is proportional to the ratio $(Qlk/I)$ of the electrode output to the energizing current and hence proportional to the true flow rate Q.

References Cited

UNITED STATES PATENTS

| | | | |
|---|---|---|---|
| 2,887,878 | 5/1959 | Kamp et al. | 73—194 |
| 2,893,243 | 7/1959 | Hurley | 73—194 |
| 3,131,560 | 5/1964 | Cushman et al. | 73—194 |
| 3,176,514 | 4/1965 | Foster | 73—229 |
| 3,425,274 | 2/1969 | Clement et al. | 73—194 |

CHARLES A. RUEHL, Primary Examiner